(12) United States Patent
Schmidt et al.

(10) Patent No.: US 8,067,480 B2
(45) Date of Patent: Nov. 29, 2011

(54) POROUS POLYISOCYANATE POLYADDITION PRODUCTS

(75) Inventors: Daniel Schmidt, Dracut, MA (US); Volker Schädler, Strasbourg (FR)

(73) Assignee: BASF SE, Ludwigshafen (DE)

( * ) Notice: Subject to any disclaimer, the term of this patent is extended or adjusted under 35 U.S.C. 154(b) by 818 days.

(21) Appl. No.: 11/916,069

(22) PCT Filed: May 30, 2006

(86) PCT No.: PCT/EP2006/062728
§ 371 (c)(1),
(2), (4) Date: Nov. 30, 2007

(87) PCT Pub. No.: WO2006/128872
PCT Pub. Date: Dec. 7, 2006

(65) Prior Publication Data
US 2008/0188577 A1    Aug. 7, 2008

(30) Foreign Application Priority Data
Jun. 3, 2005   (DE) .................. 10 2005 025 970

(51) Int. Cl.
*C08G 18/28* (2006.01)
(52) U.S. Cl. ......... 521/172; 521/113; 521/130; 521/170
(58) Field of Classification Search ........... 521/113, 521/130, 172, 170
See application file for complete search history.

(56) References Cited

U.S. PATENT DOCUMENTS

| | | | |
|---|---|---|---|
| 3,574,150 A | 4/1971 | Jefferson et al. | |
| 4,248,975 A | 2/1981 | Satterly | |
| 5,104,964 A * | 4/1992 | Kuze et al. | 528/204 |
| 5,198,522 A * | 3/1993 | Steppan et al. | 528/61 |
| 5,763,502 A * | 6/1998 | Barker et al. | 521/174 |
| 6,372,841 B1 * | 4/2002 | Anderson et al. | 524/507 |
| 2002/0061936 A1 * | 5/2002 | Van Heumen et al. | 521/155 |
| 2003/0236315 A1 * | 12/2003 | Xie et al. | 521/155 |
| 2005/0165177 A1 * | 7/2005 | Wagner et al. | 525/437 |
| 2006/0105187 A1 * | 5/2006 | Simons et al. | 428/483 |
| 2007/0173552 A1 | 7/2007 | Schadler et al. | |
| 2007/0197744 A1 | 8/2007 | Schadler et al. | |

FOREIGN PATENT DOCUMENTS

| | | |
|---|---|---|
| CN | 1129948 A | 8/1996 |
| EP | 0372539 | 6/1990 |
| EP | 1 537 166 | 6/2005 |
| EP | 1 501 882 | 10/2006 |
| WO | WO-95/02009 A1 | 1/1995 |
| WO | WO-95/03358 A1 | 2/1995 |
| WO | WO-96/36654 A1 | 11/1996 |
| WO | WO-96/37539 A1 | 11/1996 |
| WO | WO-98/44013 A1 | 10/1998 |
| WO | WO-98/44028 A1 | 10/1998 |
| WO | WO-00/24799 A1 | 5/2000 |
| WO | WO-02/10189 A2 | 2/2002 |
| WO | WO 2004/020503 | 3/2004 |
| WO | WO2005/092959 | 10/2005 |
| WO | WO2006/106104 | 10/2006 |

OTHER PUBLICATIONS

DIN 66 131—Jul. 1993.
DIN ISO 9277—May 2003.
DIN 66131 Determination of specific surface area of solids by gas adsorption using the method of Brunauer, Emmett and Teller (BET) (English language).
H. Frey et al., "Controlling the Growth of Polymer Trees: Concepts and Perspectives for Hyperbranched Polymers." Chem. Eur. J. 2000, 6, No. 14, 2499.
H. Frey et al., "Degree of Branching in Hyperbranched Polymers." Acta Polym. 1997, 48, 30.

* cited by examiner

*Primary Examiner* — John Cooney
(74) *Attorney, Agent, or Firm* — Connolly Bove Lodge & Hutz LLP

(57) ABSTRACT

Process for producing porous polyisocyanate polyaddition products by reacting (a) isocyanates with (b) compounds which are reactive toward isocyanates in the presence of (f) solvent, wherein compounds having a functionality toward isocyanates of at least 6 and a molecular weight of at least 1000 g/mol are used as (b) compounds which are reactive toward isocyanates.

17 Claims, No Drawings

POROUS POLYISOCYANATE POLYADDITION PRODUCTS

RELATED APPLICATIONS

This application is a national stage application (under 35 U.S.C. §371) of PCT/EP2006/062728, filed May 30, 2006, which claims benefit of German application 10 2005 025 970.7, filed Jun. 3, 2005.

The invention relates to a process for producing porous polyisocyanate polyaddition products, preferably polyurethanes and/or polyureas, particularly preferably polyurethanes which may, if appropriate, comprise urea structures, preferably polyurethane moldings, in particular moldings having an Aerogel-like structure based on polyurethanes, by reacting (a) isocyanates with (b) compounds which are reactive toward isocyanates in the presence of solvent (f) which is preferably inert toward isocyanates and preferably subsequently removing the solvent (f) from the polyurethane. Furthermore, the invention relates to porous polyisocyanate polyaddition products which can be obtained in this way, preferably polyurethanes and/or polyureas, particularly preferably polyurethanes, preferably polyurethane moldings, particularly preferably moldings having an Aerogel-like structure based on polyurethanes, in particular porous polyurethanes having a density in the range from 30 kg/m$^3$ to 500 kg/m$^3$ and an intrinsic surface area of >50 m$^2$/g determined by nitrogen sorption measurement in accordance with DIN 66131 and based on compounds (b) which are reactive toward isocyanates and have a functionality toward isocyanates, preferably hydroxyl groups, of at least 6, preferably from 6 to 100, particularly preferably from 10 to 60, and a molecular weight of at least 1000 g/mol, preferably from 1500 g/mol to 10 000 g/mol, particularly preferably from 1500 g/mol to 6000 g/mol, in particular from 2000 g/mol to 6000 g/mol.

Porous polyisocyanate polyaddition products which are produced in the presence of a solvent and the production of these products are generally known. Thus, U.S. Pat. No. 3,574,150 describes open-cell polyurethanes which have a porosity of at least 50% and a density of from 100 to 500 kg/m$^3$, but these comprise spherical particulate structures in the micron range as a result of a precipitation process and are based on polyarylpolyalkylene polyisocyanates (polymeric MDI). WO 96/36654, WO 96/37539 and WO 98/44028 disclose Aerogels based on isocyanurates. WO 95/03358 describes Aerogels in general which are based on isocyanates. In the context of the documents mentioned, the term "Aerogel" in each case means that a fluid is removed in the supercritical state from the gel body in a drying step. WO 98/44013 and WO 00/24799 describe the production of Aerogel-like compounds based on isocyanurates, i.e. gels obtained predominantly by trimerization of isocyanates, for which drying under supercritical conditions is not absolutely necessary. Furthermore, these documents state that copolymers comprising isocyanate-reactive groups, in particular copolymers of styrene and hydroxyacrylates, can be used in addition to the trimerization of the isocyanates.

A disadvantage of these porous products known from the prior art is that either it is necessary to use supercritical fluids (WO 95/03358, WO 96136654, WO 96/37539, WO 98/44028), which requires high pressures or temperatures (e.g. $T_c$=31° C.; $p_c$=74 bar for $CO_2$) and is therefore costly, or else products which are based to a considerable extent on isocyanurates are obtained. It is known that this class of compounds has a high brittleness and they are therefore disadvantageous in terms of mechanical properties compared to isocyanate-based materials in which the majority of the isocyanate groups have been converted into urethane groups. A further disadvantage of a network based on isocyanurate linkages is that complete conversion of the isocyanate groups into isocyanurates can be achieved only by means of long reaction times.

It is thus an object of the present invention to develop a process for producing porous polyisocyanate polyaddition products, preferably polyurethanes, preferably polyurethane moldings, in particular Aerogel-like materials based on polyurethanes, by reacting (a) isocyanates with (b) compounds which are reactive toward isocyanates in the presence of solvent (f) which is preferably inert toward isocyanates, which process is suitable, inexpensive and reproducible and gives products which have very good materials properties, in particular mechanical properties. In particular, porous products which should have a very high porosity combined with a very small pore size are to be developed. The porous products should be able to be obtained in a simple and reproducible fashion.

These objects have been able to be achieved by using compounds having a functionality toward isocyanates, preferably hydroxyl groups, of at least 6, preferably from 6 to 100, particularly preferably from 10 to 60, and a molecular weight, preferably weight average molecular weight, of at least 1000 g/mol, preferably from 1500 g/mol to 10 000 g/mol, particularly preferably from 1500 g/mol to 6000 g/mol, as (b) compounds which are reactive toward isocyanates.

A particular advantage of the process of the invention and thus the products of the invention is their mechanical stability both during the production process in the presence of the solvent and during and after drying. In addition, the products of the invention have, as desired, a low brittleness as a result of the use of the isocyanate-reactive component according to the invention, which has a high functionality in combination with a high molecular weight and can also be referred to as hyperbranched or comprises dendrimeric structures. Due to the high degree of branching of the isocyanate-reactive component, a rigid network which allows supercritical conditions during drying to be dispensed with and at the same time allows a material of low brittleness to be produced is achieved in the polyurethane Aerogel.

As groups which are reactive toward isocyanates in the compounds (b) which are reactive toward isocyanates, it is possible to use groups which have at least one active hydrogen atom. Examples of such groups are hydroxyl groups and/or primary and/or secondary amino groups, preferably hydroxyl groups. Thus, possible compounds (b) according to the invention which are reactive toward isocyanates are polyether polyalcohols, polyester polyalcohols, polyether-polyester alcohols, polythioether polyols, hydroxyl-containing polyacetals and hydroxyl-containing aliphatic polycarbonates or mixtures of at least two of the polyols mentioned. Preference is given to ethers and/or esters and/or compounds comprising ester and ether structures as compounds (b) which are reactive toward isocyanates. Such compounds are generally known and can be prepared by known esterification and/or alkoxylation.

The compounds according to the invention which are reactive toward isocyanates preferably have a hydroxyl number of at least 100 mg KOH/g, particularly preferably from 150 mg KOH/g to 550 mg KOH/g. In addition to the parameters functionality and molecular weight which are relevant to the invention, the hydroxyl number of the polyols is thus suitable for characterizing the particularly preferred hyperbranched structure of the particularly preferred polyols.

For the purposes of the present invention, the term "hyperbranched" means that the degree of branching (DB), i.e. the mean number of dendritic linkages plus the mean number of end groups per molecule, is from 10 to 99.9%, preferably from 20 to 99%, particularly preferably 20-95%.

For the purposes of the present invention, the term "dendrimer" means that the degree of branching is 99.9-100%. For the definition of the "degree of branching", see H. Frey et al., Acta Polym. 1997, 48, 30. The glass transition temperature is preferably from −50° C. to 140° C. and in particular from −50 to 100° C. (by means of DSC, measured in accordance with DIN 53765). For information about hyperbranched polymers, reference may also be made to H. Frey et al., Chem. Eur. J. 2000, 6, No. 14, 2499. The preparation of hyperbranched polyalcohols is described, for example, in EP-A 1 501 882 and EP-A 1 537 166.

Particular preference is given to using highly branched polyols comprising ester groups as compounds which are reactive toward isocyanates. Such dendritic polyesterols are, for example, the condensation products obtainable from 2,2-dimethylolpropionic acid (Bis-MPA), which are marketed by Perstorp AB under the trade name Boltorn®, e.g. Boltorn® H20, H30 and H40.

The production of porous polyurethanes is generally known from the prior art presented at the outset.

Preference is given to processes in which the reaction of (a) isocyanates with (b) compounds which are reactive toward isocyanates is carried out in the presence of a catalyst (d) which activates the isocyanate groups, as will be described by way of example at a later point, preferably a catalyst which catalyzes urethane formation, preferably an organic tin and/or titanium compound and/or a suitable amine, particularly preferably a tin salt or an amino base, preferably a tertiary amine, very preferably a dibutyltin salt or a tertiary aliphatic amine. The catalysts are preferably dissolved in the solvent (f) together with the compounds (b) which are reactive toward isocyanates. Gelling is started by combining the catalyst-comprising solution of the isocyanate-reactive component with the stoichiometric amount of isocyanate. The content of catalysts (d) is preferably in the range from 0.02 to 3% by weight, particularly preferably from 0.1 to 2% by weight, based on the total weight of the porous polyurethane. The catalyst can be removed from the polymer by intensive solvent exchange. The gelling time can be set in the range from a few minutes to a number of hours by choice of the amount of catalyst and concentration of the solvent.

On drying the gel body of the porous polyurethanes of the invention, the solvent can be removed in the subcritical state ($p<p_c$, $T<T_c$), preferably by application of a light vacuum. A solvent exchange can likewise be carried out after gelling of the polyurethane body to adjust the porosity. It is advantageous to carry out drying from a solvent which has a lower surface tension than the starting solvent. As an alternative, the polymerization is from the beginning carried out in a solvent which has such a nature that the resulting polyurethane network is so mechanically robust that it withstands the capillary forces of subcritical drying without significant shrinkage. Preference is given to solvents in which the reaction components can initially be homogenously dissolved which plasticizes the resulting polyurethane network as little as possible. Furthermore, preference is given to reaction components which have a high intrinsic chain stiffness, in particular isocyanates and isocyanate-reactive compounds having a high functionality and degree of branching.

As solvents (f) in whose presence the reaction of the isocyanates with component (b) and, if appropriate, (c) occurs, it is possible to use the solvents generally known from the prior art which are preferably inert toward isocyanates. Such solvents are described in WO 00/24799, page 3, line 28, to page 5, line 14. A solvent in which the isocyanates and isocyanate-reactive components used are soluble or dispersible to an extent of at least 1% by weight, based on the total weight of the mixture, at 298 K and the reaction of the (a) isocyanates with the (b) compounds which are reactive toward isocyanates results in a gel body in which the proportion of precipitated reaction product is less than 1% by weight, based on the total weight of the mixture, is preferably used as solvent (f). The amount of precipitated product is determined gravimetrically by filtering the reaction mixture through a suitable filter before the gel point. Particular preference is given to using aliphatic ketones and esters, preferably butanone, propanone, ethyl acetate, butyl acetate, or aliphatic ethers, preferably tetrahydrofuran, tetrahydropyran, as solvents (f).

The process of the invention is particularly preferably carried out so that the isocyanates (a) and the compounds which are reactive toward isocyanates are dissolved separately in the same solvent or different solvents (f), preferably the same solvent, and the two components (a) and (b) dissolved in the respective solvent (f) are subsequently brought to react by mixing.

The proportion by weight of the solvent (f), based on the total weight of the components used in the production of the polyurethane foam including the solvent, is preferably in the range from 50% by weight to 99% by weight, particularly preferably from 60% by weight to 95% by weight. If, as described above, the components (a) and (b) are dissolved separately in a solvent (f), the weight of the solvent (f) in the respective component is preferably in the range from 50% by weight to 99% by weight, particularly preferably from 60% by weight to 95% by weight, in each case based on the total weight of the respective mixture comprising (a) or (b) and in each case the solvent (f).

After reaction of the isocyanates (a) with the compounds (b) which are reactive toward isocyanates and, if appropriate, (c), the solvent (f) is removed from the reaction product. This can be achieved by various generally known methods, e.g. by drying or pouring off the excess solvent and subsequent drying. Drying is preferably carried out at pressures of from 0.01 mbar to 1 bar and temperatures of from −20° C. to 60° C. for a period of usually from 0.5 hours to 10 hours. Freeze drying can likewise be used for removing the solvent.

One or more changes of the solvent or the solvent mixtures can preferably be carried out after reaction of the reactants. Particularly in the production of polyurethanes according to the invention which have a density of <200 g/l, it is advantageous to carry out a solvent change. When choosing the solvent, two aspects have to be taken into account in each case:
1) the surface tension should be as low as possible, for which reason hydrocarbons and (partially) halogenated hydrocarbons are preferred solvents;
2) the solvent should plasticize the polymer network as little as possible, i.e. be a "precipitant" for the polymer, in order to avoid shrinkage under the drying conditions (preferably from −20 to 60° C.). Since such fluids are obviously unsuitable for the synthesis of the polyurethane network from the isocyanate and the isocyanate-reactive compound, it is advantageous firstly to produce the network in a fluid which swells the network and then replace this fluid by a fluid having a lower swelling capability.

After reaction of the isocyanates (a) with the compounds (b) which are reactive toward isocyanates, the solvent (f) is preferably removed, preferably by drying at a pressure which is less than the critical pressure of the solvent and at a temperature which is less than the critical temperature of the solvent used.

The reaction of the isocyanates (a) with the compounds (b) which are reactive toward isocyanates and chain extenders (c) can be carried out at the customary indexes, preferably at an index of less than 1010. The index is defined by the ratio of the total isocyanate groups of the component (a) used in the reaction to the groups which are reactive toward isocyanates, i.e. the active hydrogens, of the components (b) and (c). At an index of 1000, there is one active hydrogen atom, i.e. one function which is reactive toward isocyanates, of the components (b) and (c) per isocyanate group of the component (a). At indexes above 1000, more isocyanate groups than OH groups are present. The reaction of the isocyanates with the groups which are reactive toward isocyanates and, if appropriate, chain extenders and/or crosslinkers (c) is particularly preferably carried out at an index in the range from 950 to 1050.

Methods of producing polyurethanes are generally known. For example, the thermoplastic polyurethanes can be produced by reacting (a) isocyanates with (b) compounds which are reactive toward isocyanates and have a molecular weight of from 500 to 10 000 and, if appropriate, (c) chain extenders having a molecular weight of from 50 to 499, if appropriate in the presence of (d) catalysts and/or (e) customary auxiliaries.

The starting components and processes for producing the preferred porous polyurethanes will be presented below by way of example. The components (a) and (b) and preferably (c) and also preferably (d) and if appropriate (e) customarily used in the production of porous polyurethanes will be described by way of example below:

a) As organic isocyanates (a), it is possible to use generally known aromatic, aliphatic, cycloaliphatic and/or araliphatic isocyanates, preferably aromatic isocyanates, having at least two, particularly preferably from two to four, isocyanate groups, for example diphenylmethane 2,2'-, 2,4'- and/or 4,4'-diisocyanate (MDI), 1,5-naphthylene diisocyanate (NDI), tolylene 2,4- and/or 2,6-diisocyanate (TDI), diphenylmethane diisocyanate, 3,3'-dimethylbiphenyl diisocyanate, 1,2-diphenylethane diisocyanate and/or phenylene diisocyanate, trimethylene, tetramethylene, pentamethylene, hexamethylene, heptamethylene and/or octamethylene diisocyanate, 2-methylpentamethylene 1,5-diisocyanate, 2-ethylbutylene 1,4-diisocyanate, pentamethylene 1,5-diisocyanate, butylene 1,4-diisocyanate, 1-isocyanato-3,3,5-trimethyl5-isocyanatomethylcyclohexane (isophorone diisocyanate, IPDI), 1,4- and/or 1,3-bis(isocyanatomethyl)cyclohexane (HXDI), cyclohexane 1,4-diisocyanate, 1-methylcyclohexane 2,4- and/or 2,6-diisocyanate and/or dicyclohexylmethane 4,4'-, 2,4'- and 2,2'-diisocyanate, particularly preferably toluene diisocyanate (TDI), para-phenylene diisocyanate (PPDI), naphthalene diisocyanate (NDI), isocyanates having a functionality of at least 3 obtainable from TDI, NDI and/or PPDI by reaction with trifunctional and higher-functional alcohols, and the trifunctional isocyanates obtainable by trimerization of TDI and/or PPDI, in particular the isocyanate obtainable from TDI by reaction with trifunctional alcohols.

b) As compounds (b) which are reactive toward isocyanates, it is possible to use, if appropriate, further compounds which are generally known for this purpose in addition to the compounds presented at the outset, for example polyesterols, polyetherols and/or polycarbonate diols, which are usually also collectively referred to as "polyols", having molecular weights of from 500 to 12 000 g/mol, preferably from 600 to 6000, in particular from 800 to 4000, and preferably having a mean functionality of from 1.8 to 5. Preference is given to using exclusively the isocyanate-reactive compounds according to the invention.

c) As chain extenders and/or crosslinkers (c), it is possible to use generally known aliphatic, araliphatic, aromatic and/or cycloaliphatic compounds having a molecular weight of from 50 to 499 and a functionality of from 2 to 10, for example aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols, such as 1,2,4-, 1,3,5-trihydroxycyclohexane, glycerol and trimethylolpropane, low molecular weight hydroxyl-containing polyalkylene oxides based on ethylene oxide and/or 1,2-propylene oxide and the abovementioned diols and/or triols as starter molecules and/or diamines such as diethyltoluenediamine and/or 3,5-dimethylthio-2,4-toluenediamine. If chain extenders, crosslinkers or mixtures thereof are employed for producing the polyurethanes, they are advantageously used in an amount of from 0 to 30% by weight, preferably from 1 to 30% by weight, based on the weight of all the isocyanate-reactive compounds (b) and (c) used.

d) Suitable catalysts which, in particular, accelerate the reaction between the NCO groups of the diisocyanates (a) and the isocyanate-reactive groups of the formative components (b) and (c), in particular the hydroxyl groups and/or amino groups, are the customary tertiary amines known from the prior art, e.g. triethylamine, dimethylcyclohexylamine, N-methylmorpholine, N,N'-dimethylpiperazine, 2-(dimethylaminoethoxy)ethanol, diazabicyclo[2,2,2]octane and the like, and also, in particular, organic metal compounds such as titanic esters, iron compounds such as iron(III) acetylacetonate, tin compounds, e.g. tin diacetate, tin dioctoate, tin dilaurate or the dialkyltin salts of aliphatic carboxylic acids, e.g. dibutyltin diacetate, dibutyltin dilaurate or the like.

e) Apart from catalysts (d), customary auxiliaries (e) can also be added to the formative components (a) to (c). Examples which may be mentioned are surface-active substances, flame retardants, nucleating agents, oxidation stabilizers, lubricants and mold release agents, dyes and pigments, stabilizers, e.g. against hydrolysis, light, heat or discoloration, inorganic and/or organic fillers, reinforcing materials.

f) The solvent (f) in whose presence the reaction of the isocyanates with the component (b) and, if appropriate, (c) occurs has been discussed at the outset.

Further details regarding the abovementioned auxiliaries and additives may be found in the specialist literature, e.g. Plastics Additive Handbook, 5th edition, H. Zweifel, ed, Hanser Publishers, Munich, 2001. All molecular weights mentioned in the present text have the unit [g/mol].

The porous polyurethanes which can be produced by the process of the invention are preferably employed as insulating materials for thermal and acoustic insulation.

EXAMPLES

The isocyanate-reactive mixtures shown in Table 1 were reacted with the respective mixtures comprising isocyanates shown in Table 2 at room temperature and an index of 1000 in a closed vessel.

TABLE 1

|  | Example 1 | Example 2 | Example 3 | Example 4 | Example 5 |
|---|---|---|---|---|---|
| Boltorn ® H20 | 0.95 g | 0.95 g |  |  | 0.71 g |
| Boltorn ® H30 |  |  | 0.97 g |  |  |
| Boltorn ® H40 |  |  |  | 0.98 g |  |
| Butanone | 11.17 g |  |  |  |  |
| Propanone |  | 10.96 g | 10.96 g | 10.96 g | 11.14 g |
| DBTDL | 84.5 µl | 84.5 µl | 84.5 µl | 84.5 µl | 84.5 µl |

Boltorn ® H20: dendritic polyester alcohol, M$_w$ ~2100 g/mol, polydispersity ~1.3, T$_g$ ~30° C., OH number ~490-530 mg KOH/g, acid number ~9 mg KOH/g maximum
Boltorn ® H30: dendritic polyester alcohol, M$_w$ ~3500 g/mol, polydispersity ~1.5, T$_g$ ~35° C., OH number ~480-510 mg KOH/g, acid number ~10 mg KOH/g maximum
Boltorn ® H40: dendritic polyester alcohol, M$_w$ ~5100 g/mol, polydispersity ~1.8, T$_g$ ~40° C., OH number ~470-500 mg KOH/g, acid number ~11 mg KOH/g maximum
DBTDL: dibutyltin dilaurate.

TABLE 2

|  | Example 1 | Example 2 | Example 3 | Example 4 | Example 5 |
|---|---|---|---|---|---|
| Basonat ® TU 75E | 2.73 g | 2.73 g | 2.71 g | 2.69 g | 2.05 g |
| Butanone | 10.13 g |  |  |  |  |
| Propanone |  | 9.94 g | 9.94 g | 9.94 g | 10.39 g |

Basonat ® TU (BASF Aktiengesellchaft): a polyfunctional TDI adduct having a proportion by weight of 75% by weight in ether acetate, ~13.3% NCO content After about 3 days, the corresponding polyurethane gels were taken from the reaction vessel and transferred to a container with pentane. The volume ratio of pentane to polyurethane gel was about 10:1. After 2 days, the pentane was replaced by the same amount of fresh pentane. After a further 2 days, the gel was taken out and dried, firstly for 3 days at atmospheric pressure, subsequently for 2 days at a temperature of 60° C. and a pressure of 100 mbar.

The products of Examples 1 to 5 had the properties shown in Table 3:

TABLE 3

|  | Example 1 | Example 2 | Example 3 | Example 4 | Example 5 |
|---|---|---|---|---|---|
| Density [kg/m$^3$] | 440 | 270 | 270 | 280 | 210 |
| Pore size [nm] | 58 | 140 | 47 | 110 | 150 |
| Specific surface area [m$^2$/g] | 150 | 100 | 124 | 135 | 88 |
| Porosity [%] | 68 | 80 | 80 | 80 | 85 |

Density measured by gas pycnometry (DIN 66137)
Pore size measured by nitrogen sorption (DIN 66134)
Specific surface area measured by the BET method (DIN 66131)
Porosity measured by Hg intrusion (DIN 66133)

The pore analysis in Table 3 shows that the gels produced from the components listed in Tables 1 and 2 are nanoporous materials after subcritical drying. In particular, comparison of the Hg intrusion and the nitrogen sorption shows that the proportion of pores smaller than 1 µm is greater than 95%. The mean pore size of 50-150 nm makes these materials particularly advantageous for use as insulating material in thermal insulation. All materials displayed a high mechanical stability and low brittleness.

The invention claimed is:

1. A process for producing porous polyisocyanate polyaddition products comprising: reacting isocyanates (a) with compounds reactive toward isocyanates (b) in the presence of solvent inert toward isocyanates (f) and subsequently removing said solvent (f) from the polyurethane, wherein said compounds (b) are hyperbranched, with a degree of branching from 10% to 99.9%, and have a functionality toward isocyanates of at least 6 and a molecular weight of at least 1000 g/mol.

2. The process of claim 1, wherein said compounds (b) comprise compounds which have a hydroxyl number of at least 100 mg KOH/g.

3. The process of claim 1, wherein said compounds (b) comprise polyols comprising ester groups.

4. The process of claim 1, wherein said isocyanates (a) comprise aromatic isocyanates having at least two isocyanate groups.

5. The process of claim 1, wherein the reaction of isocyanates (a) with compounds (b) is carried out in the presence of a catalyst (d) which activates the isocyanate groups.

6. The process of claim 1, wherein said isocyanates (a) and said compounds (b) are soluble or dispersible to an extent of at least 1% by weight, based on the total weight of the mixture, at 298 K in said solvent (f) and wherein the reaction of said isocyanates (a) with said compounds (b) results in a gel body in which the proportion of precipitated reaction product is less than 1% by weight, based on the total weight of the mixture.

7. The process of claim 1, wherein one or more changes of said solvent (f) is carried out after reaction of the reactants.

8. The process of claim 1, wherein said solvent (f) comprises aliphatic ketones and esters.

9. The process of claim 1, wherein the proportion by weight of said solvent (f) is in the range of from 50% by weight to 99% by weight, based on the total weight of the components used in the production of the polyurethane foam including the solvent.

10. The process of claim 1, wherein said solvent (f) is removed after the reaction of said isocyanates (a) with said compounds (b) by selecting a pressure which is less than the critical pressure of said solvent (f) and a temperature which is less than the critical temperature of said solvent (f) during drying.

11. The process of claim 1, wherein the reaction of said isocyanates (a) with the isocyanate-reactive groups of the compounds (b) and, optionally, with chain extenders and/or crosslinkers (c) is carried out at an index in the range of from 950 to 1050.

12. The process of claim 1, wherein the degree of branching of said compounds (b) is from 20% to 99%.

13. The process of claim 12, wherein the degree of branching is from 20% to 95%.

14. The process of claim 13, wherein the degree of branching is from 20% to 95%.

15. A process for producing a porous polyisocyanate polyaddition product comprising:
reacting isocyanates (a) with compounds reactive toward isocyanates (b) in the presence of solvent inert toward isocyanates (f) and
removing said solvent (f) from the porous polyisocyanate polyaddition product by drying at a pressure which is less than the critical pressure of the solvent (f) and at a temperature which is less than the critical temperature of the solvent (f);

wherein said compounds (b) are hyperbranched, with a degree of branching from 10% to 99.9%.

16. The process of claim 15, wherein the degree of branching of said compounds (b) is from 20% to 99%.

17. The process of claim 16, wherein the degree of branching of said compounds (b) is from 20% to 95%.

* * * * *